United States Patent
Woodward et al.

(10) Patent No.: US 10,353,356 B2
(45) Date of Patent: Jul. 16, 2019

(54) GEOSTEERING SYSTEMS AND METHODS THEREOF

(71) Applicant: BHL Boresight, Inc., Tyler, TX (US)

(72) Inventors: Raymond Woodward, Tyler, TX (US); John Northcott, Tyler, TX (US); Kent Davis, Tyler, TX (US)

(73) Assignee: BHL BORESIGHT, INC., Tyler, TX (US)

( * ) Notice: Subject to any disclaimer, the term of this patent is extended or adjusted under 35 U.S.C. 154(b) by 315 days.

(21) Appl. No.: 14/631,739

(22) Filed: Feb. 25, 2015

(65) Prior Publication Data
US 2015/0240616 A1    Aug. 27, 2015

Related U.S. Application Data

(60) Provisional application No. 61/944,642, filed on Feb. 26, 2014.

(51) Int. Cl.
*E21B 44/00* (2006.01)
*G05B 15/02* (2006.01)
(Continued)

(52) U.S. Cl.
CPC ............... *G05B 15/02* (2013.01); *E21B 7/04* (2013.01); *E21B 47/026* (2013.01); *G01V 1/40* (2013.01)

(58) Field of Classification Search
CPC ......... G05B 15/02; E21B 7/04; E21B 47/026; G01V 1/40
See application file for complete search history.

(56) References Cited

U.S. PATENT DOCUMENTS 8,875,806 B2 † 11/2014 Williams
2008/0239871 A1 10/2008 Thevoux-Chabuel
(Continued)

FOREIGN PATENT DOCUMENTS

| CA | 2888037 A1 | 5/2014 |
|----|-----------|--------|
| EP | 2420863 | 2/2012 |
| WO | 2015130836 | 9/2015 |

OTHER PUBLICATIONS

International Preliminary Report on Patentability of the International Searching Authority for co-pending PCT application No. PCT/US2015/017591, dated Aug. 30, 2016.
(Continued)

*Primary Examiner* — Mohamed Charioui
*Assistant Examiner* — Jeremy Delozier
(74) *Attorney, Agent, or Firm* — Kirby Drake

(57) ABSTRACT

The present disclosure relates, in some embodiments, to methods and systems of geosteering or geological operations. In some embodiments, systems of the present disclosure may transmit MWD or LWD data to a processor. The processor may extrapolate and convert the MWD or LWD data into KBTVD or pseudo-vertical data. Said extrapolation may be performed based on algorithmic expressions between the True Vertical Depth, the formation dip angle, and a Vertical Section Distance. In some embodiments, vertical data may be extrapolated by a processor and converted into pseudo-horizontal data. In some embodiments, systems may evaluate the formation dip angle and extrapolate a corrected true thickness of an interval layer. Screen representations of aforementioned data may be provided for. Embodiments of the present disclosure may provide for improved or more accurate data and/or virtualizations in the horizontal and/or vertical directions.

26 Claims, 10 Drawing Sheets

(51) Int. Cl.
*E21B 7/04* (2006.01)
*E21B 47/026* (2006.01)
*G01V 1/40* (2006.01)

(56) References Cited

U.S. PATENT DOCUMENTS

| | | | |
|---|---|---|---|
| 2010/0312478 A1* | 12/2010 | Tabanou | G01V 11/00 702/7 |
| 2012/0191354 A1† | 7/2012 | Caycedo | |
| 2013/0131989 A1 | 5/2013 | Buiting et al. | |
| 2013/0222390 A1* | 8/2013 | Ross | G01V 11/00 345/440 |
| 2013/0238306 A1 | 9/2013 | Lagenwalter et al. | |
| 2014/0025302 A1 | 1/2014 | Alshawaf et al. | |
| 2015/0292266 A1* | 10/2015 | Johnson | E21B 7/04 175/24 |

OTHER PUBLICATIONS

Offie Action issued by Canadian Intellectual Property Office in co-pending Canadian application No. 2,940,191, dated Sep. 22, 2016.

International search report and written opinion of the international searching authority for co-pending PCT application No. PCT/US2015/017591 dated Jul. 15, 2015.

Office Action issued by Canadian Intellectual Property Office in co-pending Canadian application No. 2,940,191, dated May 4, 2017.

Aaron Wheeler, et al. The Introduction of an At-Bit Natural Gamma Ray Imaging Tool Reduces Risk associated with Real-time Geosteering Decisions in Coalbed Methane Horizontal Wells. pp. 1-12. SPWLA 53rd Logging Symposium, Jun. 16-20, 2012.†

Hughes Thevoux-Chabuel. Updating the Reservoir Model while Drilling—a New Geosteering Methodology. pp. 1-7. DEW Journal, Apr. 2010.†

Michael Stoner. Technical Geosteering. Hart's E&P Magazine, pp. 1-4. Nov. 2007.†

Kevin O'Connell et al. Geosteering Improves Bakken Results. The American Oil & Gas Reporter. pp. 1-5. Jan. 2012.†

Rocky Mottahedeh. A multilateral case study in the san Juan Basin: Integrated Geosteering Technology Combined with Near Bit Azimuthal Gamma Tools, pp. 1-25, Search and Discovery article #40813 (2011).†

\* cited by examiner
† cited by third party

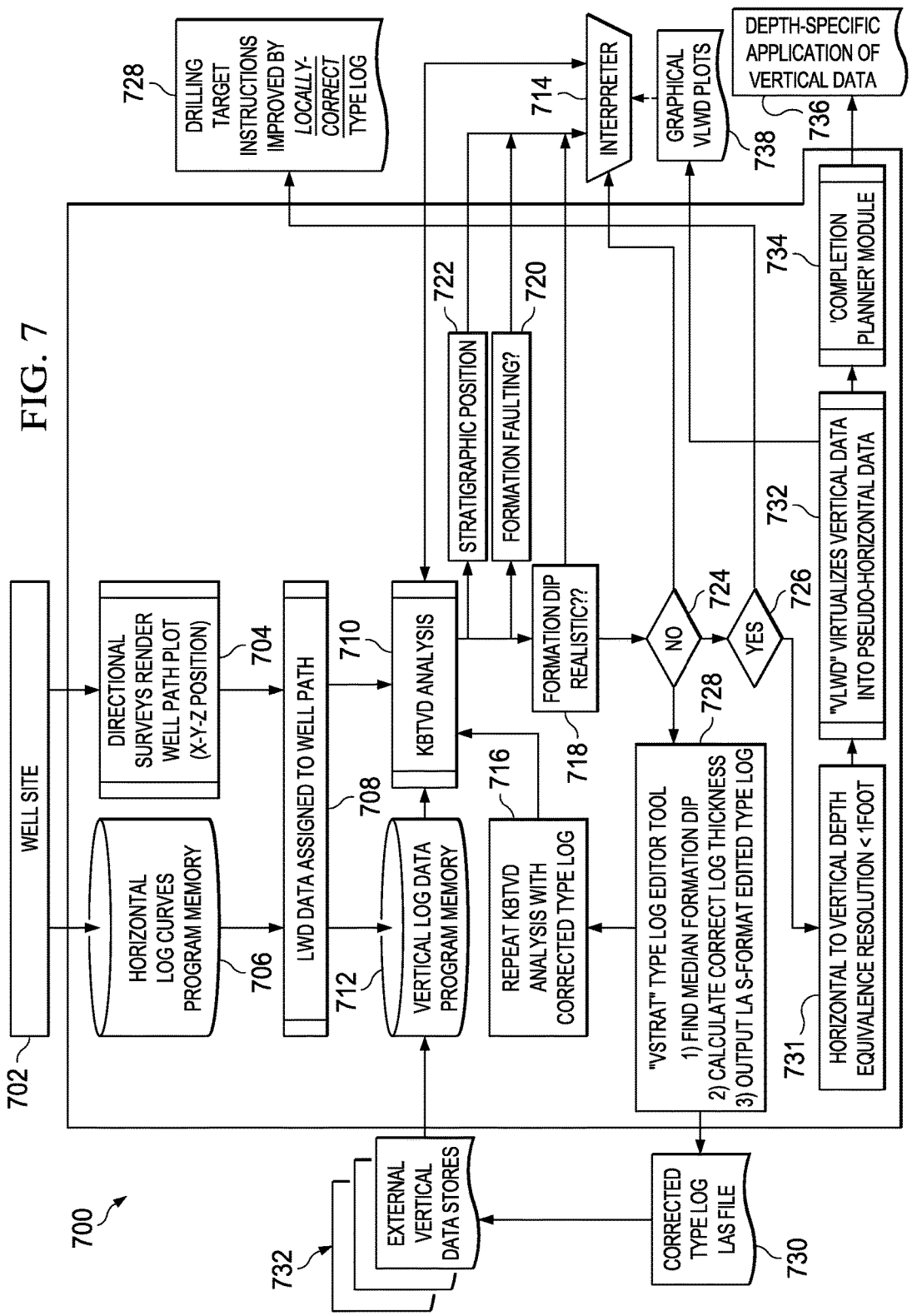

GEOSTEERING SYSTEMS AND METHODS THEREOF

CROSS-REFERENCE TO RELATED APPLICATIONS

The present disclosure relates and claims priority to provisional patent application No. 61/944,642, filed Feb. 26, 2014, entitled "Geosteering Systems and Methods Thereof." This provisional patent application is hereby incorporated by reference in its entirety.

FIELD OF THE DISCLOSURE

The present disclosure relates, in some embodiments, to methods and systems of geosteering or geological operations. More specifically, some embodiments may provide for virtualization of data in the horizontal and/or vertical directions.

BACKGROUND OF THE DISCLOSURE

Subsurface rock formations may generally comprise vertical stackings of various rock strata or rock formations. Each layer of rock formation may have unique characteristics. Some layers of rock formations may be oil-gas productive. Wellbores may be drilled through subsurface rock formations to reach oil-gas productive layers so that, among other purposes, materials such as oil and gas may be extracted. In some circumstances, horizontal drilling may advantageously allow for greater productivity in the extraction of oil and gas.

However, fluctuations in the vertical stacking of various rock strata or rock formations may present difficulties in navigating a wellbore such that the wellbore is maintained in a desired stratigraphic interval or layer. For example, formation dips, or the angle of tilt of a stratigraphic interval, may require that a trajectory of a wellbore be continuously adjusted. One of ordinary skill in the art would appreciate that various rock strata or rock formations may or may not be orderly arranged. Thus, certain rock strata may exhibit angles of tilt, sometimes over distances of hundreds or thousands of horizontal feet across a surface.

Various geosteering techniques may be utilized to help ensure that horizontal wellbores are positioned in a desired stratigraphic interval. Wellbores may be better steered or positioned when practitioners have more accurate data or virtualization of the geological formations in a relevant subsurface region. Absent such accurate data, practitioners may have to rely on broad and potentially imprecise guesses or estimations. More accurate data or virtualizations may be desirable in both the horizontal and vertical directions.

SUMMARY

Accordingly, a need has arisen for improved methods and systems of geosteering to provide for more accurate data and/or virtualizations in the horizontal and/or vertical directions.

The present disclosure relates, in some embodiments, to methods and systems of geosteering or geological operations. More specifically, some embodiments may provide for virtualizations of vertical logs into pseudo-horizontal data. Such embodiments may provide for improved or more accurate data and/or virtualizations in the horizontal and/or vertical directions. In some embodiments, systems of the present disclosure may transmit MWD or LWD data to a processor. The processor may extrapolate and convert the MWD or LWD data into KBTVD or pseudo-vertical data. Said extrapolation may be performed based on algorithmic expressions between the True Vertical Depth, the formation dip angle, and a Vertical Section Distance. In some embodiments, vertical data may be extrapolated by a processor and converted into pseudo-horizontal data. In some embodiments, systems may evaluate the formation dip angle and extrapolate a corrected true thickness of an interval layer. Screen representations of aforementioned data may be provided through a user interface device.

Methods for geosteering according to the present disclosure may comprise collecting, by at least one down-hole sensor associated with a wellbore, empirical measure-while-drilling data while drilling a subsurface well. Methods may further comprise storing, by a non-transitory computer readable storage medium in communication with the at least one down-hole sensor, the collected empirical measure-while-drilling data. Methods may further comprise determining, by a processor in communication with the non-transitory computer readable storage medium, a calculated vertical-log, wherein the calculated vertical-log is extrapolated at least in part based on the empirical measure-while-drilling data, and wherein the calculated vertical-log is reflective of stratigraphy along a substantially vertical direction. Methods may further comprise determining, by the processor, a calculated horizontal-log, wherein the calculated horizontal-log is extrapolated at least in part based on the calculated vertical-log, wherein the calculated horizontal-log is reflective of stratigraphy along a substantially horizontal direction, and wherein the calculated horizontal-log provides for horizontal-foot-to-vertical-foot equivalence.

In some embodiments, methods may further comprise presenting, by a display device in communication with the processor, a graph of the empirical measure-while drilling data and a graph of the calculated horizontal-log. In some embodiments, methods may further comprise presenting, by a display device in communication with the processor, a graph of both the empirical measure-while drilling data and the calculated horizontal-log. The graph of the empirical measure-while drilling data may be presented adjacent to the graph of the calculated horizontal-log.

Methods may further comprise adjusting a drilling path of the wellbore based at least in part on the calculated horizontal-log. Methods may further comprise determining a calculated vertical-log is based at least in part on a true vertical depth, a formation dip angle, and a vertical section distance. Methods may further comprise receiving an input, wherein the input provides an adjusted thickness value for a stratigraphic layer along the substantially vertical direction. Methods may further comprise determining, by the processor, an adjusted horizontal-log, wherein the adjusted horizontal-log is extrapolated at least in part based on the adjusted thickness value. Methods may further comprise presenting, by a display device, a graph of the adjusted horizontal-log.

The present disclosure also provides for systems of geosteering. Systems of geosteering may advantageously be configured to perform the aforementioned methods. In some embodiments, systems may comprise at least one down-hole sensor, the at least one down-hole sensor configured to collect empirical measure-while-drilling data while drilling a subsurface well. In some embodiments, systems may comprise a non-transitory computer readable storage medium, wherein the non-transitory computer readable storage medium is in communication with the at least one down-hole sensor, and wherein the non-transitory computer readable storage medium configured to store the collected empirical measure-while-drilling data. Systems may further comprise a processor in communication with the non-transitory computer readable storage medium, the processor configured to determine a calculated vertical-log and a calculated horizontal log.

The calculated vertical-log may be extrapolated at least in part based on the empirical measure-while-drilling data. The calculated vertical-log may be reflective of stratigraphy along a substantially vertical direction. The calculated horizontal-log may be extrapolated at least in part based on the calculated vertical-log. The calculated horizontal-log may be reflective of stratigraphy along a substantially horizontal direction. The calculated horizontal-log provides for horizontal-foot-to-vertical-foot equivalence.

BRIEF DESCRIPTION OF THE DRAWINGS

Some embodiments of the disclosure may be understood by referring, in part, to the present disclosure and the accompanying drawings, wherein:

FIG. 7 illustrates an example system of the present disclosure.

DETAILED DESCRIPTION

Figure 1A:
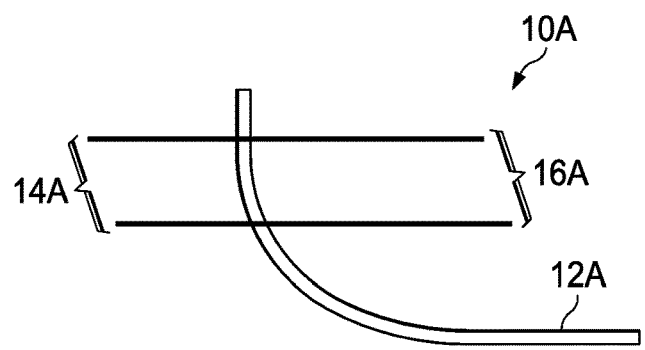
FIG. 1A illustrates an example wellpath through a stratigraphic interval.

The present disclosure relates, in some embodiments, to methods and systems of geosteering or geological operations. More specifically, some embodiments may provide for virtualizations of vertical logs into pseudo-horizontal data. Such embodiments may provide for improved or more accurate data and/or virtualizations in the horizontal and/or vertical directions.

Embodiments of the present disclosure may utilize empirical data to provide virtualizations in the horizontal and/or vertical directions. Empirical data used may include Measure While Drilling ("MWD") or Log While Drilling ("LWD") data. MWD or LWD data may refer to data that is collected in the wellbore and transmitted to a processor or an interface device at the surface while a deviated or horizontal well is being drilled. MWD and LWD data may refer to at least two categories or types of data. One category or type may comprise surveys, which may indicate or report the 3-dimensional positioning of a wellbore. Another type of MWD and LWD data may comprise log curves measuring various rock strata properties. Such log curves may advantageously be used to identify characteristics of a stratigraphic interval and may allow one to determine whether drilling is occurring in the target interval or whether the wellbore needs to be adjusted. Additionally or alternatively, such determinations may allow for one to assess the productivity of stratigraphic intervals and whether particular stratigraphic intervals are suitable for hydraulic fracture treatments or other extraction treatments. The two categories of MWD and LWD data described here are provided as examples only. MWD and LWD data may comprise other data acquired while a well is being drilled. Such empirical data may also be used without departing from the scope of the present disclosure.

In some embodiments, the present disclosure may provide for digital conversions of horizontal or near-horizontal MWD and LWD data into pseudo-vertical log views. For any given trajectory of a wellbore within a well, MWD and LWD data may suggest an apparent thickness of a particular stratigraphic interval. An apparent thickness may or may not be equivalent to or accurately reflect a true stratigraphic thickness of a particular interval. Whereas the true stratigraphic thickness may be the actual thickness, the apparent thickness may be a thickness as indicated or suggested by empirically collected data. Apparent interval thickness may be a function of a true stratigraphic thickness, a formation dip of the stratigraphic interval, and an angle of incidence of the wellbore.

An angle of incidence of a wellbore may be referred to as an inclination. An angle of incidence or inclination may refer to an angle of the wellbore with respect to a vertical axis. Such angle may generally be expressed in degrees. In some conventions, a wellbore directed straight down may be described as having an angle of incidence or an inclination of 0 degrees. A wellbore directed horizontally may be described as having an angle of incidence or an inclination of 90 degrees. Further, a wellbore directed directly upwards towards the surface along the vertical may be described as having an angle of incidence or an inclination of 180 degrees. Such conventions are provided for example only. Other conventions for denoting an angle of incidence or an inclination may be used without departing from the scope of the present disclosure.

The functional relationship between an apparent interval thickness and a true stratigraphic thickness is shown in FIGS. 1A, 1B, 1C, and 1D. FIG. 1A depicts an example wellpath through a stratigraphic interval 10A. As shown, the trajectory or wellpath 12A of the wellbore through the target interval may be nearly perpendicular. Logs collected perpendicular to or near perpendicular to a stratigraphic layer may closely represent the true stratigraphic thickness 14A of the layer. Explained differently, logs collected perpendicular to a stratigraphic layer may roughly be equivalent to a vertical log. Accordingly, the apparent thickness 16A may be equivalent or substantially equivalent to the true stratigraphic thickness 14A.

Figure 1B:
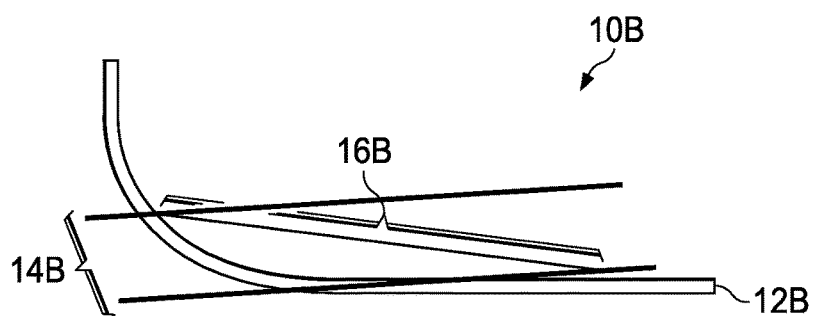
FIG. 1B illustrates an example wellpath through a stratigraphic interval.

FIG. 1B depicts another example wellpath through a stratigraphic interval 10B. As shown in FIG. 1B, the trajectory or wellpath 12B of the wellbore is oblique to the stratigraphic layer. Logs collected oblique to an interval may exaggerate the interval thickness and may not resemble a vertical type log and may not accurately reflect the true stratigraphic thickness 14B. As shown in FIG. 1B, as a result of an oblique angle of incidence, an apparent thickness 16B may be stretched or may be substantially exaggerated and/or substantially greater as compared to the true stratigraphic thickness 14B.

Figure 1C:
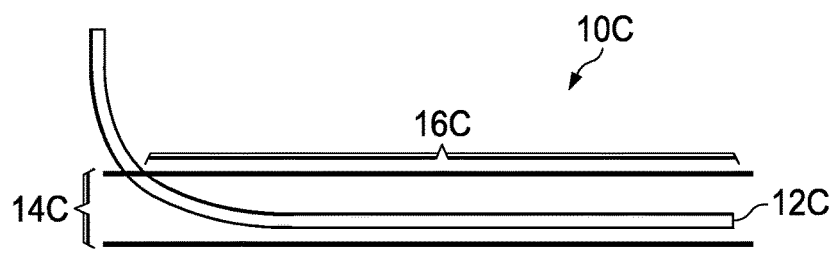
FIG. 1C illustrates an example wellpath through a stratigraphic interval.

FIG. 1C depicts yet another example wellpath through a stratigraphic interval 10C. Similarly, in FIG. 1C, the angle of incidence of the wellbore may result in an exaggerated or inaccurate apparent thickness 16C. As shown in FIG. 1C, an angle of incidence in the well may be parallel or near parallel to the target interval. In such circumstances, the trajectory or wellpath 12C of the wellbore may approach a "flat-line" or may be parallel to the target interval. Accordingly, the apparent thickness 16C may be significantly exaggerated or stretched, and may become theoretically unlimited. Thus, the apparent thickness 16C may be substantially exaggerated and/or substantially greater as compared to the true stratigraphic thickness 14C.

Figure 1D:
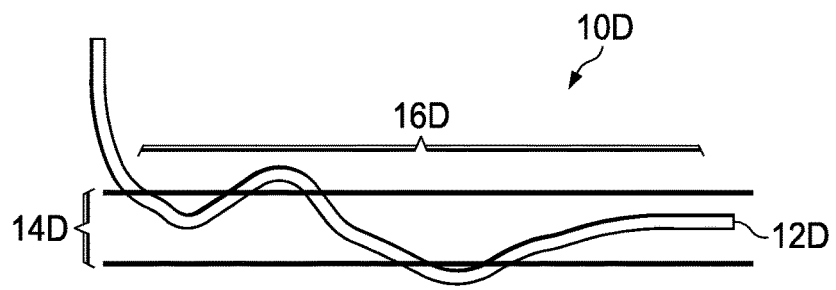
FIG. 1D illustrates an example wellpath through a stratigraphic interval.

FIG. 1D depicts yet another example wellpath through a stratigraphic interval 10D. As shown in FIG. 1D, the trajectory or wellpath 12D of the wellbore may cross over a target interval multiple times. Described differently, a wandering wellbore trajectory may cross over target interval boundaries repeatedly. Logs collected while wandering sub-parallel to beddings or intervals may show thicknesses exaggerated and bed boundaries crossed multiple times. In such circumstances, the apparent thickness 16D may also be stretched or may otherwise be inaccurate relative to the true stratigraphic thickness 14D.

As described, an apparent interval thickness may be a function of a true stratigraphic thickness, a formation dip of the stratigraphic interval, and an angle of incidence of the wellbore. Since an apparent interval thickness may be inaccurate and may fail to accurately reflect the true stratigraphic thickness, it may be advantageous to calculate the true thickness of a particular stratigraphic interval.

An angle of incidence or an inclination may be known from MWD or LWD data. An apparent thickness may be measured or otherwise collected from type logs or MWD or LWD data. Accordingly, such known data may be processed by a processor to model formation dips and/or resolve an angle of incidence. As a result, the relevant formation dips may be determined. Furthermore, the stratigraphic vertical component may be determined and presented on a display device as a pseudo-vertical log.

Pseudo-vertical logs may also be referred to as Kelly Bushing True Vertical Depth ("KBTVD"). KBTVD may refer to the True Vertical Depth (TVD) under the Kelly Bushing drilling rig. TVD may be the vertical depth of any point in a wellpath below the zero-depth datum. TVD may be determined or calculated irrespective of any lateral displacement out from under the drilling rig.

KBTVD may refer to the depth of any point in a wellpath if projected back under the drilling rig at a specified formation dip angle. KBTVD may be expressed, for example, as, " . . . 9500' under the rig, projected in at 92.0 degrees." Described differently, KBTVD may be a vector-derived depth under the drilling rig. KBTVD may be advantageously applied as a way to correct TVD for the up-down influence of formation dips over a particular horizontal distance.

A horizontal distance may be measured or calculated as the Vertical Section Distance ("VSD"). VSD may be a calculated distance from a surface drilling location to any point in a horizontal wellpath, if said point is projected into the Vertical Section Plane perpendicular to the Vertical Section Plane Azimuth.

Vertical Section Plane may refer to a hypothetical plane of vertical section, as though the earth or stratigraphic formation had been sliced away by a vertical cut through a hypothetical line (direction), to an unspecified depth.

Vertical Section Plane Azimuth may be the compass bearing azimuth of the idealized Vertical Section Plane. In horizontal wells, it may usually be the compass bearing (0-359.99 degrees) from the surface drilling location to the terminus of the horizontal well. It may be a straight line, though not necessarily drilled. The Vertical Section Plane Azimuth may define the compass-bearing orientation of the Vertical Section Plane.

Figure 2A:
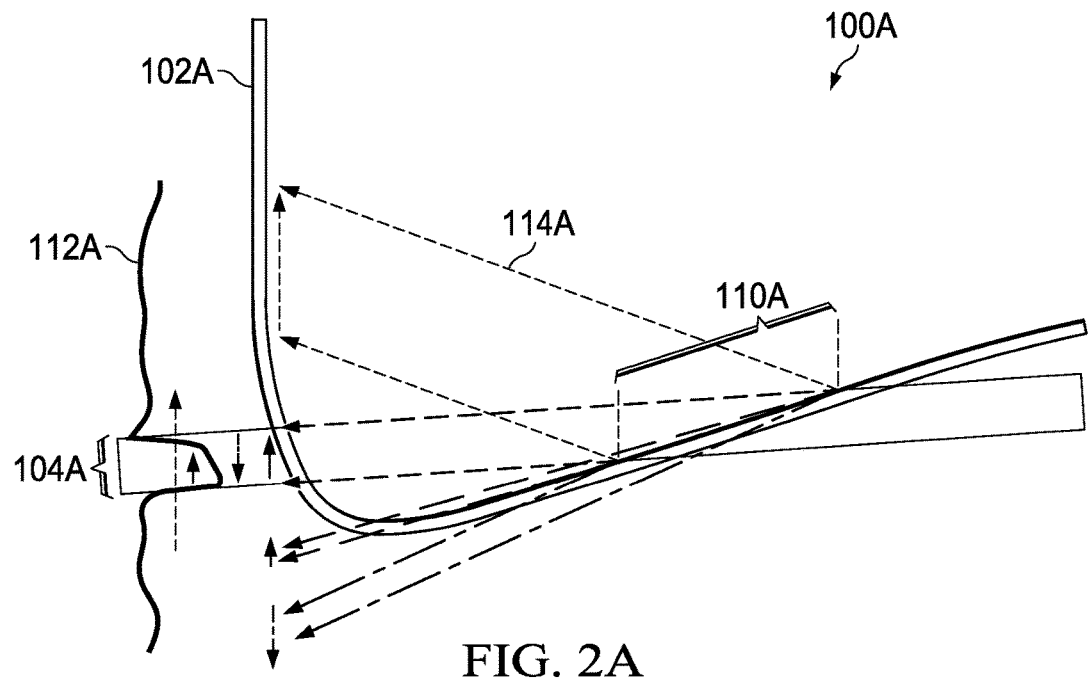
FIG. 2A illustrates various formation dip models applied to a stratigraphic interval.

Depictions of various embodiments of generating or extrapolating pseudo-vertical logs or KBTVD are shown in FIGS. 2A, 2B, 2C, 2D, 2E, 2F, and 2G. Diagram 100A of FIG. 2A illustrates formation dip models applied to a stratigraphic interval. Referring to FIG. 2A, various formation dip models for a particular wellpath 102A or trajectory are displayed. FIG. 2A depicts a visualization of a vertical type log 112A. Further, as shown in FIG. 2A, a wellpath 102A may traverse upwards from the base of an interval to the top of an interval. Various formation dip angles may be used to extrapolate the true stratigraphic thickness of an interval. In FIG. 2A, various formation dip models 114A are depicted using dashed lines at varying angles. Models and corresponding calculations may be based at least in part on the wellpath distance across a stratigraphic layer section 110A. As shown, some formation dip models may result in inaccurate calculations of true stratigraphic thickness 104A. However, an accurate formation dip model may determine a true stratigraphic thickness 104A. Determination of a true stratigraphic thickness may advantageously provide for better understanding of characteristics of a well and advantageously allow for better geosteering of a wellbore.

Figure 2B:
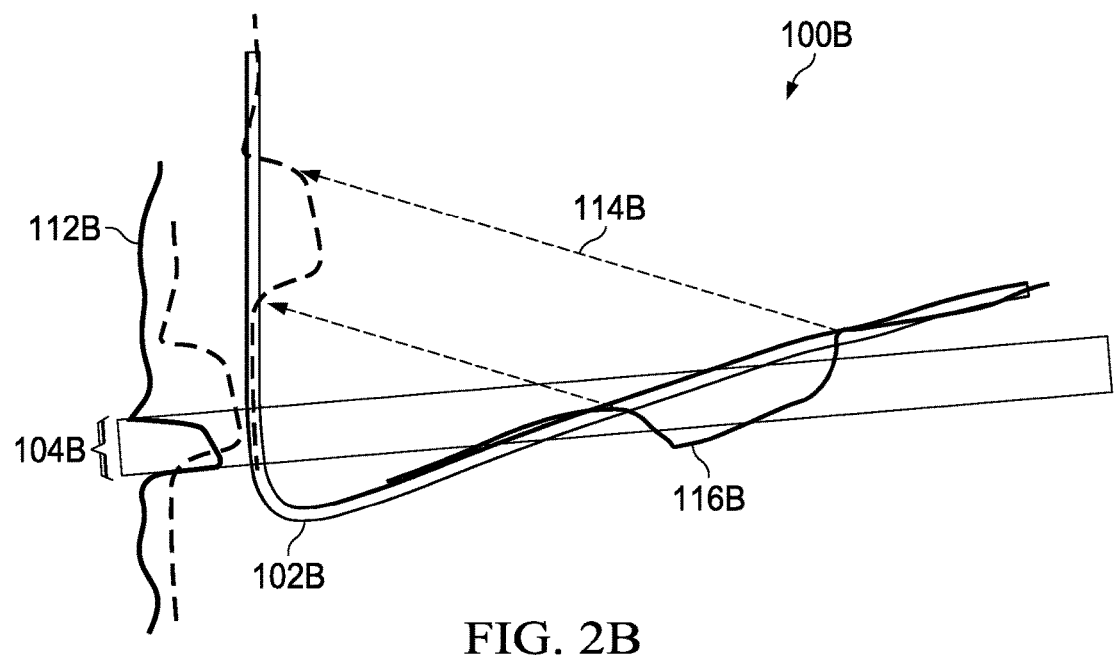
FIG. 2B illustrates an example incorrect formation dip model angle.
Figure 2C:
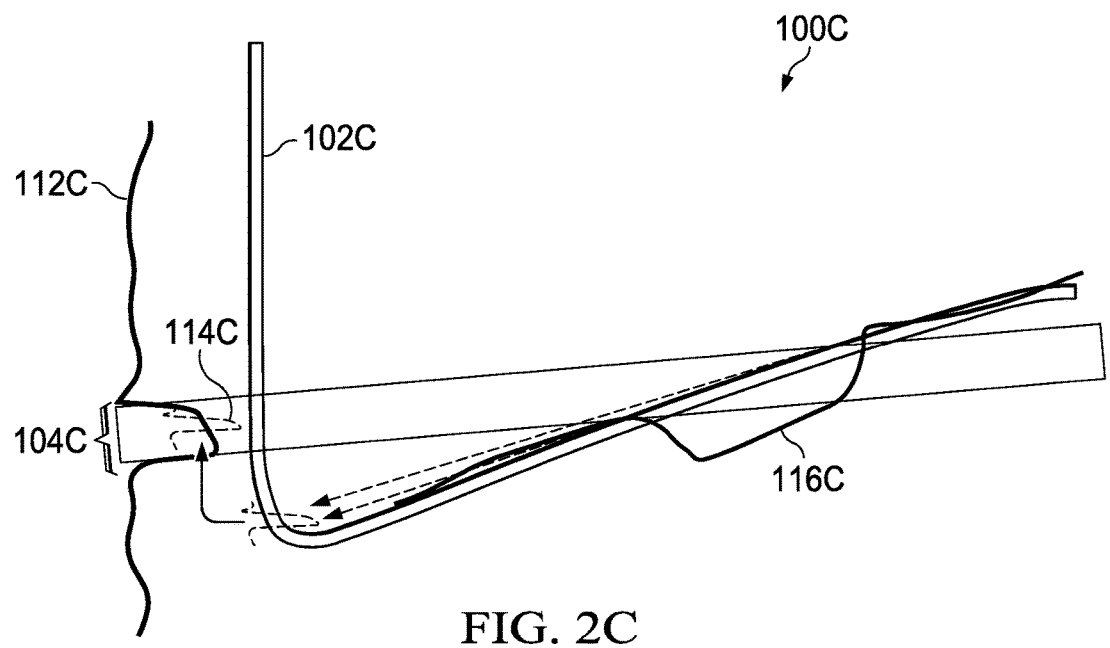
FIG. 2C illustrates an example incorrect formation dip model angle.
Figure 2D:
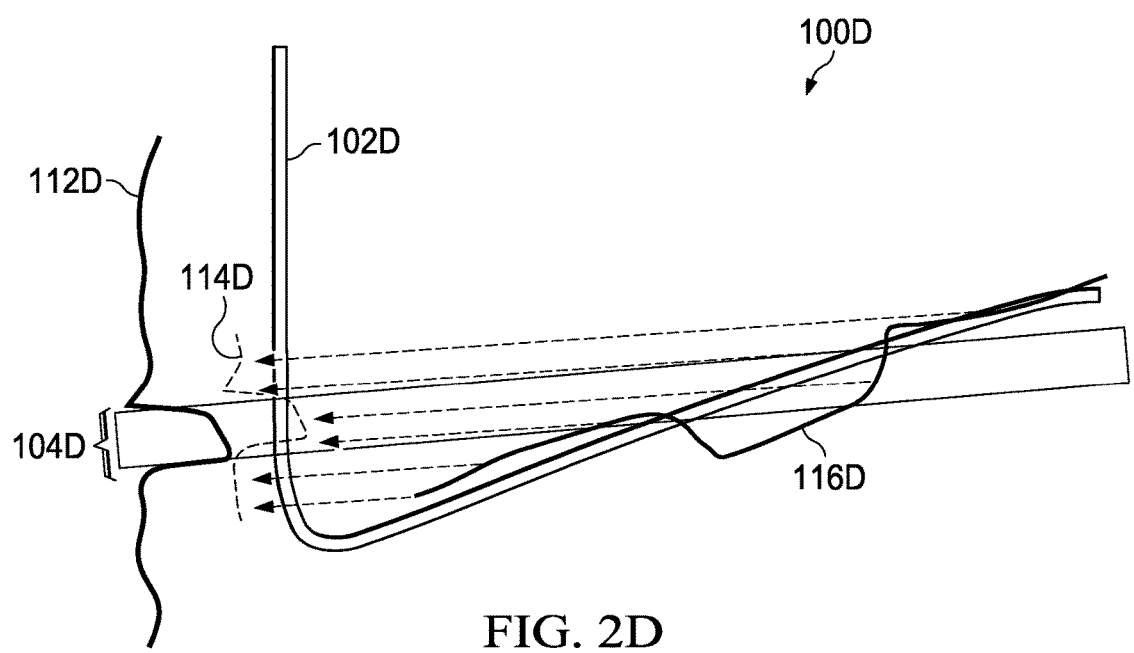
FIG. 2D illustrates an example correct formation dip model angle.

Further examples are depicted in FIGS. 2B, 2C, and 2D. Diagram 100B of FIG. 2B illustrates formation dip models applied to a stratigraphic interval. FIG. 2B depicts a visualization of a vertical type log 112B and MWD log curve data collected in a lateral hole 116B. Further, as shown in FIG. 2B, an incorrect formation dip angle may resolve MWD or LWD data into an incorrect or inaccurate pseudo-vertical thickness. More specifically, an incorrect formation dip angle as applied to modelling formation 114B may result in a model or extrapolation that may be offset and/or exaggerated, and may not accurately predict and/or correspond to a true stratigraphic thickness 104B.

Similarly, diagram 100C of FIG. 2C also depicts a situation where an incorrect formation dip angle may resolve MWD or LWD data into an incorrect or inaccurate pseudo-vertical thickness. FIG. 2C also depicts a visualization of a vertical type log 112C and MWD log curve data collected in a lateral hole 116C. Similar to FIG. 2B, the modelling formation 114C in FIG. 2C may also be inaccurate as a result of incorrect formation dip angle. Thus, the model or extrapolation may not accurately predict and/or correspond to a true stratigraphic thickness 104C.

In contrast, diagram 100D of FIG. 2D depicts an example of where MWD or LWD log curve data may be resolved into a true stratigraphic thickness with the correct formation dip angle. FIG. 2D also depicts a visualization of a vertical type log 112D and MWD log curve data collected in a lateral hole 116D. However, in FIG. 2D, a correct formation dip angle may be applied and may thus result in an accurate modelling formation 114D. Thus, the modelling formation 114D may accurately reflect the true stratigraphic thickness 114D.

Conversion or extrapolation of horizontal or near horizontal MWD or LWD data into pseudo-vertical data may be performed using various algorithms. In some embodiments, appropriate algorithms may be based on trigonometric functions. For example, if drilling in an up-dip direction, wherein a formation interval is tilted upwards away from the drilling rig, pseudo-vertical data or KBTVD may be expressed as:

$$KBTVD=TVD+(\tan(D))(VSD)$$

Or, if drilling in a down-dip direction, wherein a formation interval is tilted downwards away from the drilling rig, pseudo-vertical data or KBTVD may be expressed as:

$$KBTVD=TVD-(\tan(D))(VSD)$$

In such expressions, KBTVD may be the Kelling Bushing True Vertical Depth. TVD may be the True Vertical Depth. D may be the absolute value of a formation dip angle above or below a horizontal plane. VSD may be the Vertical Section Distance.

Figure 2E:
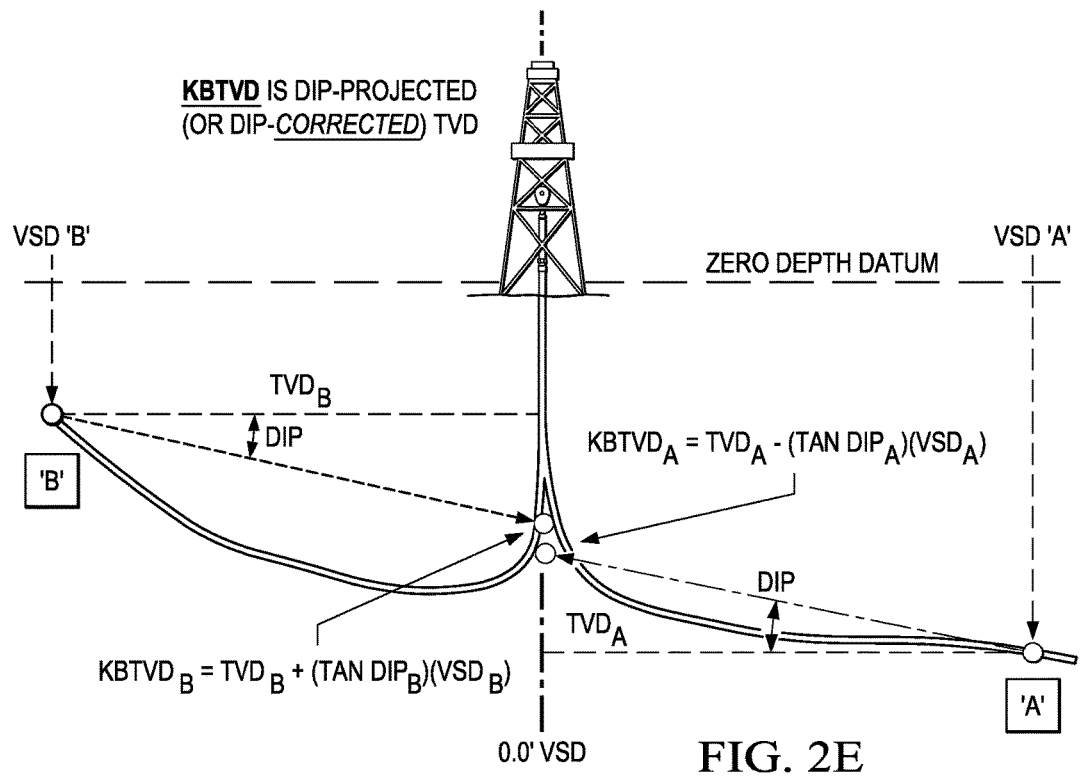
FIG. 2E illustrates an example diagram of extrapolation KBTVD or pseudo-vertical data.

TVD and VSD may be calculated from directional survey data. D may be provided as a variable input. A user or practitioner may input various values of D to model different formation dip scenarios. FIG. 2E depicts the use of the above example expressions to calculate or extrapolate KBTVD or pseudo-vertical data of particular wellbore trajectories. It should be appreciated that the above expressions and the expressions depicted in FIG. 2E are provided by way of example only. The expressions may be rearranged or may take into account other or different variables without departing from the scope of the present disclosure.

In some embodiments, the present disclosure provides for a visualization of the conversion or extrapolation of pseudo-vertical data or KBTVD from MWD or LWD data. FIG. 2F shows an example screen presentation of such conversion or extrapolation. As shown, varying amounts of MWD or LWD data may be necessary to resolve different amounts or portions of pseudo-vertical or KBTVD data. In the example shown in FIG. 2F, a portion of the wellpath may require approximately 800' of horizontal or near horizontal data to resolve into approximately 7' of stratigraphic thickness via KBTVD conversion. It should be appreciated that the amount of horizontal or near horizontal data required to resolve a portion of KBTVD may vary and may be dependent on factors such as the apparent thickness, formation dip, angle of incidence, and interval characteristics.

In some embodiments, the present disclosure provides for visualizations or screen presentations of various KBTVD extrapolations resolved from various formation dip angle models. As shown in FIGS. 2A, 2B, 2C, and 2D, various pseudo-vertical data may be derived based on a predicted or modeled formation dip angle. Such models may or may not result in accurate calculations or extrapolations of a true stratigraphic thickness.

Figure 2G:
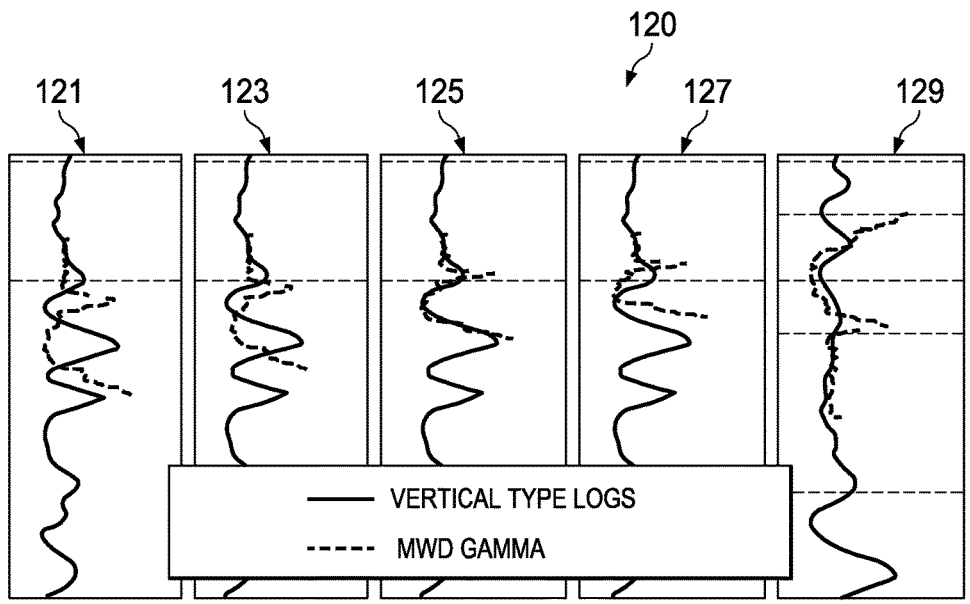
FIG. 2G illustrates a screen representation of an example embodiment of the present disclosure.
Figure 2F:
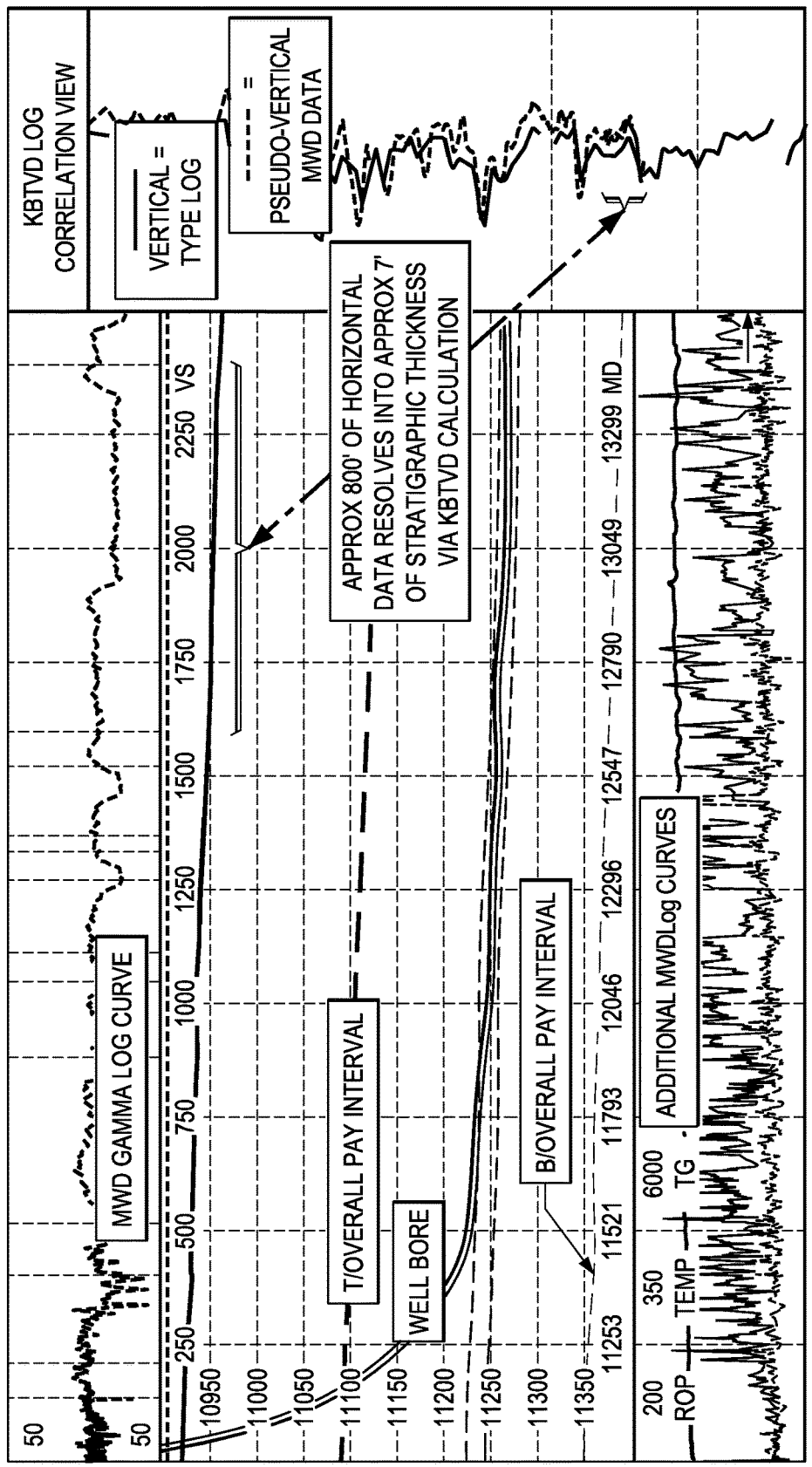
FIG. 2F illustrates a screen representation of an example embodiment of the present disclosure.

FIG. 2G depicts various KBTVD projections based on differing formation dip angle models. Different formation dip angle models may be superimposed over a corresponding vertical type log. Depending on how accurately or precisely a KBTVD projection may be superimposed over a vertical type log, a user or practitioner may better understand the stratigraphic characteristics of the wellbore path and may better determine the actual formation dip angle. Accordingly, embodiments of the present disclosure may advantageously allow a user to more accurately and efficiently guide a wellbore and thereby increase the likelihood that a wellbore may be drilled or may be maintained in a desired interval.

For example, FIG. 2G depicts an example visual display 120 or visual presentation according to a specific embodiment of the present disclosure. As shown, visual display 120 may comprise various graphs wherein a visualization of a MWD log may be superimposed or be adjacent to a visualization of a vertical type log. The placement of the MWD logs and the vertical type logs are depicted in FIG. 2G for demonstrative purposes only. Different visual arrangements may be achieved without departing from the present disclosure.

As shown in FIG. 2G, some comparative graphs 121, 123, 127, 129 depict MWD logs that may not well correspond to a vertical type log. In contrast, some comparative graphs 125 may depict MWD logs that more accurately correspond to a vertical type log. In this manner, a practitioner may better understand the stratigraphic characteristics of the wellbore path and may understand that the actual formation dip angle may be the same as or substantially close to the formation dip angle used for the modelling formation of the MWD log in comparative graph 125. Further, a practitioner may understand that the actual formation dip angle is not the same and/or may be substantially different than the formation dip angles used for the modelling formations of the MWD logs in comparative graphs 121, 123, 127, 129.

It should be appreciated that screen presentations as shown in FIGS. 2F and 2G are given by way of example only. Various adjustments or additions may be made to the screen presentations shown in FIGS. 2F and 2G without departing from the scope of the present disclosure.

Extrapolations of pseudo-vertical data or KBTVD data may provide various advantages that may become apparent to one of ordinary skill in the art having the benefit of the present disclosure. As one example, embodiments of the present disclosure may effectively allow for the conversion of otherwise essentially unrecognizable MWD or LWD data into pseudo-vertical data. Such pseudo-vertical data may then be matched or compared with a vertical type log.

As another example, extrapolation of pseudo-vertical data or KBTVD data may resolve a stratigraphic position of a wellpath and may resolve a formation dip of a particular stratigraphic interval. With such information, it may be possible to provide more specific steering instructions or chart more accurate steering paths through particular target stratigraphic intervals.

Figure 3:
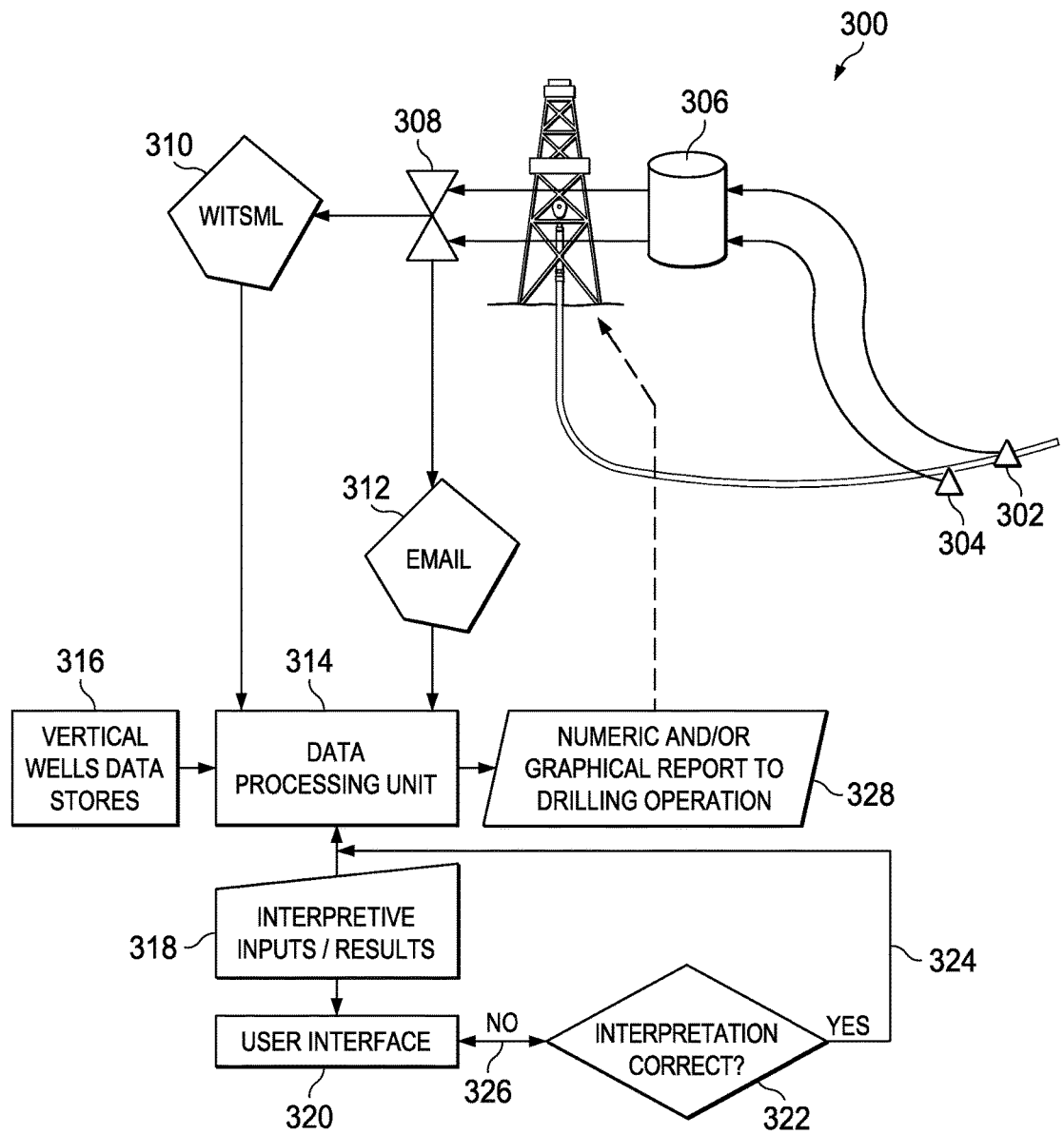
FIG. 3 illustrates a example system of the present disclosure.

Some embodiments of the present disclosure may provide for systems which may be suitable for the aforementioned conversion of MWD or LWD data into pseudo-vertical data or KBTVD data. FIG. 3 depicts an example system 300 according to the present disclosure. As shown in FIG. 3, system 300 may comprise a drill site surface location 302. A drill site surface location may comprise at least one wellbore sensor 304. In some embodiments, system 300 may comprise a plurality of wellbore sensors 304. Providing for a plurality of sensors 304 may advantageously provide for added data collection capabilities. Further, drill site surface location 302 may comprise a drill site surface data store 306. Additionally or alternatively, drill site surface location 302 may be in communication with drill site surface data store 306. Drill site surface data store 306 may or may not be physically located at the drill site surface location 302. In some embodiments, drill site surface data store 306 may be a remote storage device or remote storage unit. Drill site surface data store 306 may comprise a non-transitory computer-readable storage medium. Such storage medium may be a random access memory (RAM), a read only memory (ROM), a memory card, a magnetic and/or optical recording medium and its corresponding drive, or any other appropriate storage device.

Wellbore sensors 304 may be in communication with drill site surface data store 306 so that data collected may be transmitted to and stored at drill site surface data store 306. Drill site surface data store 306 may receive data collected from down-hole sensors 304. Wellbore sensors may be 304 in communication with drill site surface data store 306 and may be configured to transmit data thereto. Data transmitted may comprise directional survey data, log curves, and other measurements obtained through the wellbore or drilling operation.

The drill site surface data store may be in communication with a data validation and aggregation unit 308. Data validation and aggregation unit 308 may comprise any of a processor, a microprocessor, a processing logic that may interpret and execute instructions, or other appropriate device. Data validation and aggregation unit 308 may be operable to process the data received from the data store 306. Data validation and aggregation unit 308 may be operable to perform data validation, data processing, and data aggregation. In some embodiments, data validation and aggregation unit 308 may receive data directly from the wellbore sensors 304.

Data validation and aggregation unit 308 may process the data and then transmit MWD or LWD data. MWD or LWD data may be provided or transmitted through various means or in various formats. As shown in FIG. 3, the MWD or LWD data may be provided in a particular format such as a WISML stream 310. In some embodiments, WITSML or "Well Information Transfer System ML" may be a near-real-time data stream feed. As another example, MWD or LWD data may be provided or transmitted via e-mail 312. Other formats, data streams, or data delivery methods may be used without departing from the scope of the present disclosure.

MWD or LWD data may be provided to a data processing unit 314. The data processing unit 314 may be any of a processor, a microprocessor, a processing logic that may interpret and execute instructions, or other appropriate device. For example, a personal computer, tablet, or other electric processing device may be appropriate. The data processing unit 314 may be in communication with any of the data validation and aggregation unit 308, the drill site surface data store 306, and/or the wellbore sensors 304. The data processing unit 314 may receive inputs comprising the MWD or LWD data. Further, the data processing unit 314 may also receive inputs comprising vertical well log data. Such vertical well log data may be received from any of the data validation and aggregation unit 308, the drill site surface data store 306, the wellbore sensors 304, and/or another data source. For example, data may be provided from vertical wells data stores 316. Vertical wells data stores 316 may provide data corresponding to vertical wells. In some embodiments, data corresponding to vertical wells may be collected prior to an instant drilling project. Still further, the data processing unit 314 may also receive user inputs 318. User inputs 318 may be received from any appropriate form of user input device or user interface device such as a mouse, a keyboard, or a touchpad.

The data processing unit 314 may convert and otherwise generate KBTVD data or pseudo-vertical logs based on the methods described herein. Extrapolated KBTVD or pseudo-vertical logs may be presented through a user interface 320, such as a display or screen. Example displays or screens are shown in FIGS. 2F and 2G. Extrapolated KBTVD or pseudo-vertical logs may be interpreted 322, qualitatively or quantitatively. Such interpretations may be performed by the data processing unit 314 or a user. Through data interpretation, a determination may be made as to whether an accurate or desired KBTVD or pseudo-vertical log has been generated. If so, the KBTVD data outputted may be stored or used for further processing 324. If not, additional or new user input through user interface 320 may be requested and/or received 326. Further, additional or new KBTVD or pseudo-vertical logs may be extrapolated based on differing formation dip models. Results of a KBTVD or pseud-vertical log extrapolation may be delivered, transmitted, or otherwise electronically reported to a drilling operation 328. Such transmission 328 may advantageously allow a wellbore to be more accurately steered or maintained within a desired stratigraphic interval.

In some embodiments, the present disclosure advantageously provides for processing of vertical data and projecting said vertical data out along a horizontal well. Thus, empirically collected vertical data may be converted or extrapolated as pseudo-horizontal data. Explained differently, a valuable horizontal-foot-to-vertical-foot equivalence may be established and used to map vertical data along the horizontal direction or along a horizontal well.

One or ordinary skill in the art having the benefit of the present disclosure would appreciate that it may be comparatively more difficult, both economically and operationally, to collect the same quality of data in the horizontal direction as is feasible in the vertical direction. Vertical data may often be more detailed or robust. Accordingly, establishing a horizontal-foot-to-vertical-foot equivalence may advantageously allow for the detailed and robust vertical data to be mapped or projected along a horizontal well. The derived pseudo-horizontal data may allow for further improved steering of a wellbore in a drilling path.

Conversion into pseudo-horizontal data as provided by the present disclosure may be significantly more accurate and precise than other forms of area-wide estimations. For example, estimations based on vertical pilot wells may require a "connect-the-dot" thought processes that may require area-wide assumptions or estimates. Furthermore, such vertical pilot wells may often be thousands of feet to miles apart. Thus, these area-wide extrapolations based on relatively few data points may likely fail to capture the benefits of the horizontal-foot-to-vertical-foot equivalence of KBTVD data.

As another example, 3D seismic technology may be highly dependent upon vertical well penetrations for providing accurate time-to-depth conversions. Briefly stated, seismic data may rely on inducing an acoustic event at a surface and "listening" or otherwise measuring reflected-refracted acoustic returns. Surface geophones may then record the acoustic signal's round-trip travel time. However, converting time data to useful depth information or stratigraphic characteristics may often require some form of guess work or broad area-wide interpolations. Accordingly, the data generated may not be as robust or as accurate.

In contrast, embodiments of the present disclosure may advantageously capitalize on the horizontal-foot-to-vertical-foot equivalence of KBTVD data to "play back" or "virtualize" data from vertical wells onto newly interpreted horizontal wells. Such data may be generated based on the horizontal-foot-to-vertical-foot equivalence that may be derived from the KBTVD-based interpretations described above. The depth-to-depth equivalences may be stored in a memory unit or other hardware component so that generation of pseudo-horizontal data may be efficient and convenient.

Described further, in some embodiments, the present disclosure provides for establishing an equivalence between a vertical depth and a horizontal depth. For example, it may be concluded that a vertical depth of 9500' is stratigraphically equivalent to horizontal depth 11,000'. Accordingly, a system may assign vertical log curve values found at 9500' to the horizontal well at 11,000'. In such manner, valuable and robust data in the horizontal direction may be generated.

Pseudo-horizontal data may also be referred to as Virtual MWD data or Virtual LWD data. The derived pseudo-horizontal data or Virtual MWD data may be viewed as though it had been collected in the horizontal well. Pseudo-horizontal data or Virtual LWD data generated according to the present disclosure may allow for a high level of precision that may be advantageous for geosteering and navigation of wellbores through horizontal wells.

In some embodiments, vertical resolution achieved may be less than one vertical foot. Depending on the amount of data processed or the processor being used, generation of pseudo-horizontal data may be achieved in a matter of seconds. Such conversions or data processing may also be unaffected by mapping grid-contour algorithms, interpolation-extrapolation algorithms, and geometric map projection issues that may be common in 2-D or 3-D mapping. Finally, pseudo-horizontal extrapolations according to the present disclosure may be unaffected by inaccuracies inherent in directional surveys from horizontal wells.

Embodiments of the present disclosure may advantageously provide for improved quality-checking and validation of geosteering interpretations. By projecting vertical-log data on screen alongside genuinely non-vertical data, the geosteering interpreter may have efficient access to a different visualization of the correlation between vertical type log and horizontal log curves. Furthermore, the fact that the pseudo-horizontal data may be provided as a different visualization may advantageously aid users or interpreters in overcoming interpretive (mental) bias and pattern recognition.

Another advantage of the present disclosure is that, in some embodiments, pseudo-horizontal data generated from vertical data may more effectively allow for evaluation of productive capacity and economic viability of horizontal wells. Stratigraphically equivalent intervals may share similar rock properties, e.g. productivity or non-productivity, suitability for frac stimulation, hydrocarbon storage volumes, etc. Further, it may be comparatively inexpensive and mechanically feasible to cut core samples and run enough wireline-conveyed logging tools in vertical wells to make thorough evaluations of relevant rock properties. In contrast, for horizontal wells, equally thorough evaluations may be significantly more expensive and mechanically difficult to perform. The present disclosure provides for pseudo-horizontal data that may make it possible to assign vertically-derived rock properties along the horizontal wellpaths with great specificity as to a position in a three-dimensional subsurface space. This may dramatically improve decisions regarding whether to drilling or not, estimate per-well drainage area, optimize well placement, predict future economics, etc. Such benefits flow from the fact that the three-dimensional subsurface volume may be more precisely populated with advanced rock property data. In other words, the extrapolation of rock properties from widely-spaced vertical wells may be more precise, and may therefore be more reliable and more quickly achieved.

Yet another advantage of the present disclosure relates to the cost effectiveness of the disclosed embodiments. Completion techniques, such as frac procedures, may often comprise over two-thirds of the cost of a completed-producing horizontal well. Frac jobs may frequently cost over several million dollars. Significant portions of this high cost may be attributed, at least in part, to the gross regional-scale assumptions that may be used to determine the desired locations of pilot wells or the desired location of a drilling operation. Indeed, the detailed geomechanical rock properties that can only be evaluated in vertical wells may demonstrably dominate cost, performance, and effectiveness of horizontal-well frac procedures. Of particular importance may be Young's Modulus and Poison's Ration values which quantify the rock's brittleness-ductility, and therefore its susceptibility to frac procedures. In vertical wells, it may be relatively easy, cost-effective, and common to acquire the data necessary to calculate these values. In horizontal wells however, it may be cost-prohibitive or mechanically difficult to collect such data. According, the present embodiments providing for accurate and precise pseudo-horizontal data that may advantageously promote time and cost efficiency in designing and executing various drilling operations.

Figure 4:
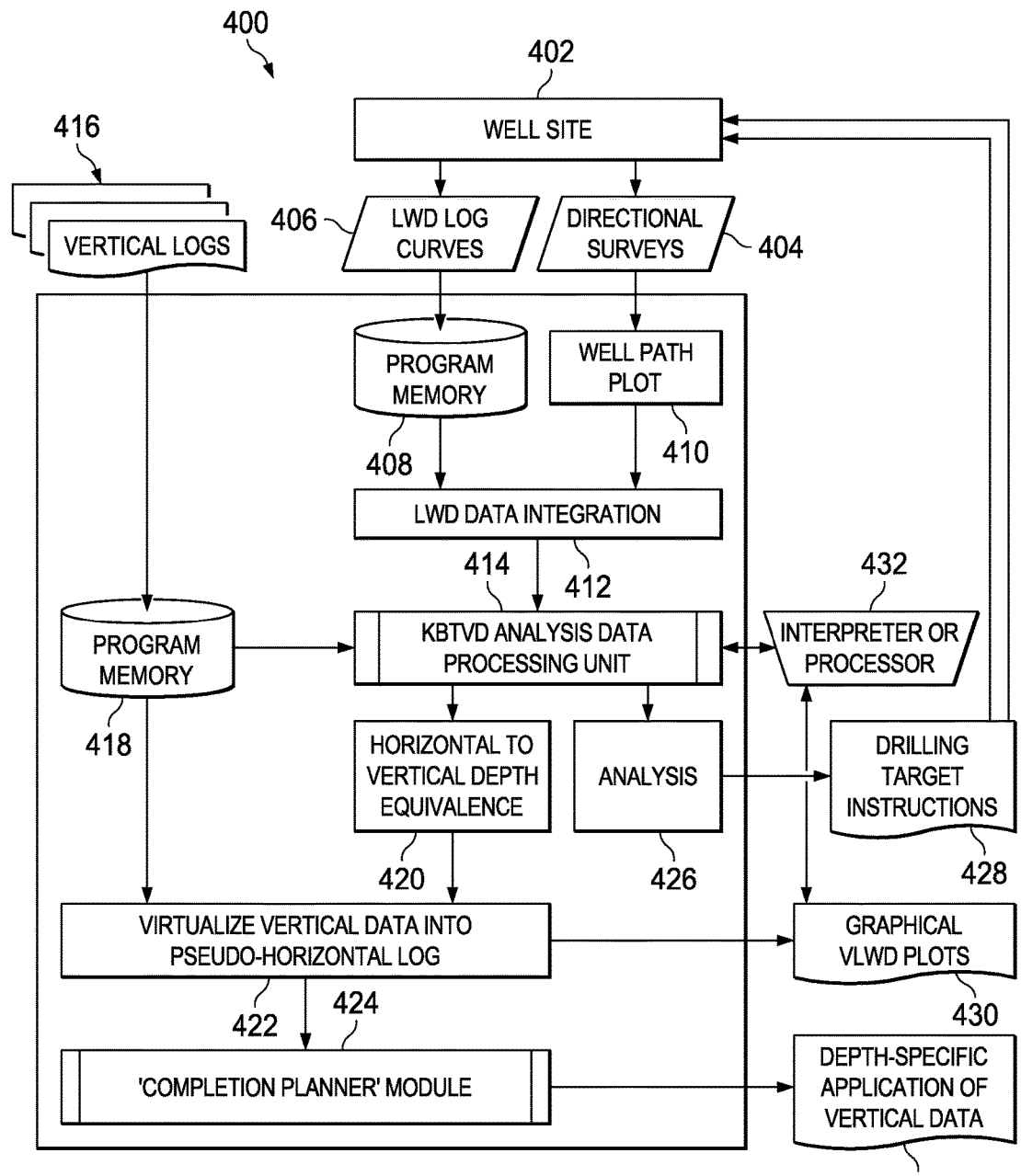
FIG. 4 illustrates a example system of the present disclosure.

Some embodiments of the present disclosure provide for systems which may be suitable for the aforementioned conversion of MWD or LWD data into pseudo-vertical data or KBTVD data. Systems may also provide for conversion of said vertical data into pseudo-horizontal data. FIG. 4 depicts an example system 400 according to the present disclosure. It should be appreciated that the example system depicted in FIG. 4 may comprise any and all of the features previously described in FIG. 3.

As shown in FIG. 4, the exemplary system 400 may comprise a well site 402 or drill site surface location. Well site 402 may collect data or otherwise provide data from user inputs or memory storage devices. For example, in some embodiments, well site 402 may provide directional surveys 404, which may be about 30' to about 90' apart. In some embodiments, well site 402 may provide LWD log curves 406, which may be about 0.5' to about 1.0' step. In some embodiments, well site 402 may provide both directional surveys 404 and LWD log curves 406. LWD log curves 406 may be transmitted to and/or stored on program memory 408. Directional surveys 404 may be provided through a wellpath plot 410. Minimum curvature interpolation between actual survey renders of wellpath plot (X-Y-Z position) may be about 0.5' to about 1.0' in step length.

Data from LWD log curves 406 may be integrated 412 with the wellpath plot 410. In some embodiments, LWD log curves 406 may be assigned to or plotted against wellpath plot 410. For example, program memory 408 may transmit data from LWD log curves 406 to a processor to plot or otherwise graphically display LWD log curves on the wellpath plot 410. In this manner, each data point may be placed in an X-Y-Z position.

As shown, the system 400 may comprise various memory units and processing units as depicted in FIG. 4. A memory unit may be a non-transitory computer-readable storage medium. Such storage medium may be a random access memory (RAM), a read only memory (ROM), a memory card, a magnetic and/or optical recording medium and its corresponding drive, or any other appropriate storage device. A processing unit may be any of a processor, a microprocessor, a processing logic that may interpret and execute instructions, or other appropriate device. Additional memory units and processing units may be used without departing from the scope of the present disclosure.

As shown in FIG. 4, various data and inputs may be provided to a processing unit for KBTVD analysis. KBTVD analysis may be performed by a KBTVD data processing unit 414. Such inputs may comprise MWD or LWD data and vertical logs. In some embodiments, LWD log curves 406 and directional surveys 404 may be provided to the KBTVD data processing unit 414. Additional data or user inputs may be provided without departing from the scope of the present disclosure. For example, vertical logs 416 may be transmitted to or otherwise stored on a program memory 418. Program memory 418 may be a same or different memory storage device as program memory 408. Program memory 418 may transmit or otherwise provide vertical logs 416 to KBTVD data processing unit 414.

Once conversion by a processing unit is performed, horizontal to vertical depth equivalence data may be generated 420. In some embodiments, such data may have a resolution of less than one feet. Such data may then be further processed by virtualizing vertical data into pseudo-horizontal data or a calculated horizontal-log 422. The further processing may occur on the same processor as where KBTVD analysis took place. Alternatively, a separate processor may be used to virtualize vertical data into pseudo-horizontal data. Further processing may comprise conversion of vertical data into pseudo-horizontal data based on KBTVD-derived horizontal-foot-to-vertical-foot equivalences.

As shown in FIG. 4, systems of the present disclosure may also comprise a Completion Planner Module 424. Completion Planner Module 424 may be operable to facilitate the designing of frac jobs. More specifically, the Completion Planner Module may streamline the completion of a frac job. The Completion Planner Module 424 may advantageously provide for an interactive, graphically interface layout with various details of an intended frac job and relevant data, metrics, and other information. (e.g., perforations in the steel casing pipe, placement of packers between frac stages, etc.). The Completion Planner Module 424 may advantageously allow a user to define a set of "rules" to dictate where the frac job would be performed or targeted. The "rules" may effectively establish "not-here" exclusion zones, based upon any data series or condition stored in a database. The user may select the data series of interest and may define the ranges of acceptable-unacceptable values.

As shown in FIG. 4, embodiments of the present disclosure may advantageously provide for additional features to facilitate the planning and execution of frac jobs. In some embodiments, Completion Planner Module 424 may provide for depth-specific application of vertical data 434. Depth-specific application of vertical data 434 may advantageously provide for improved visualization of subsurface stratigraphy and may allow for improved qualitative and quantitative analysis. In some embodiments, depth-specific application of vertical data 43 may be provided graphically and may allow for improved completion and design of frac procedures.

In some embodiments, KBTVD data processing unit 414 may provide quantitative and/or qualitative analysis 426 regarding stratigraphic position, formation dips, and geologic faults. Such analysis 426 may be performed by the KBTVD data processing unit 414, another appropriate processor, a practitioner, and/or a combination thereof. Analysis 426 may result in new and/or changes to drilling target instructions 428. For example, based on analysis 426, drilling target instructions regarding the direction and/or angle of the wellbore at the well site 402 may be adjusted.

In some embodiments, system 400 may provide for graphical virtual LWD ("VLWD") plots 430. Graphical VLWD may allow for additional interpretation or data analysis by an interpreter or processor 432. Interpreter or processor 432 may extract information from graphical VLWD plots 430 and provide further adjustments and/or input to KBTVD data processing unit 414.

Figure 5:
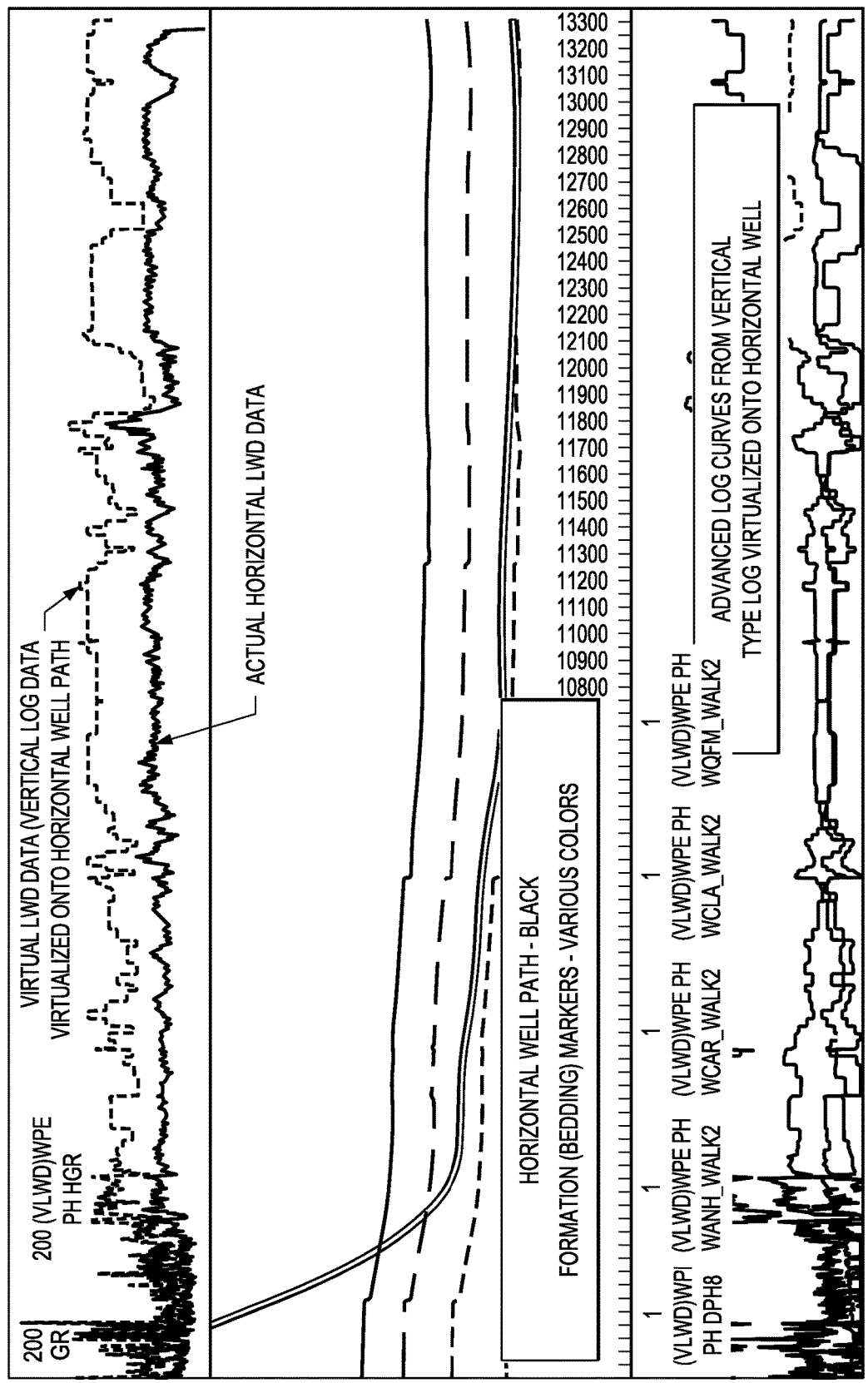
FIG. 5 illustrates a screen representation of an example embodiment of the present disclosure.

The pseudo-horizontal data may be presented via a screen or display. FIG. 5 shows an example screen presentation of pseudo-horizontal data or virtual LWD data. As shown in FIG. 5, pseudo-horizontal data may be superimposed or overlaid on top of or next to actual horizontal LWD data. Other data may be displayed to provide a user or practitioner information regarding the stratigraphic characteristics of the trajectory of a wellbore. It should be appreciated that the screen presentation as shown in FIG. 5 is given by way of example only. Various adjustments or additions may be made to the screen presentation without departing from the scope of the present disclosure.

In another aspect of the present disclosure, embodiments may advantageously correct a determination of bed thickness or interval thickness. Extrapolations of KBTVD data may generate exaggerated formation dips. Explained differently, extrapolated KBTVD data may suggest formation dips that are too steep—either upwards or downwards. Such exaggerated formation dips may lead to erroneous drilling instructions and out-of-zone wellpaths. Similarly, the generation of Virtual LWD or pseudo-horizontal data may lead to slightly erroneous results. Errors may occur because the stratigraphy and rock properties are different between the type log and those found in the newer horizontal well.

Corrections of such errors may be made to KBTVD data or pseudo-horizontal data. Such corrections may allow for a determination of a true stratigraphic thickness and may no require the need for drilling vertical type wells or vertical pilot wells solely for the purpose of determining correct interval thickness. Indeed, such vertical pilot wells may be cost prohibitive and may significantly hamper the time and cost effectiveness of a drilling operation.

In some embodiments, thickness corrections may advantageously be performed prior to further processing of data. Thus, in some embodiments, thickness correction may be performed prior to extrapolating vertical data out into the horizontal direction to generate pseudo-horizontal data as previously described.

As previously described, conversion or extrapolation of horizontal or near horizontal MWD or LWD data to pseudo-vertical data may be performed using various algorithms. In some embodiments, appropriate algorithms may be based on trigonometric functions. For example, if drilling in an up-dip direction, wherein a formation interval is tilted upwards away from the drilling rig, pseudo-vertical data or KBTVD may be expressed as:

$$KBTVD = TVD + (\tan(D))(VSD)$$

Or, if drilling in a down-dip direction, wherein a formation interval is tilted downwards away from the drilling rig, pseudo-vertical data or KBTVD may be expressed as:

$$KBTVD = TVD - (\tan(D))(VSD)$$

In such expressions, KBTVD may be the Kelling Bushing True Vertical Depth. TVD may be the True Vertical Depth. D may be the absolute value of a formation dip angle above or below a horizontal plane. VSD may be the Vertical Section Distance.

By finding the correct D angle solution, apparent Measured Depth Thickness may be reconciled or compressed to a True Thickness. Then, the MWD-LWD log curves may be displayed according to their KBTVD. This may have the effect of compressing stretched-out or exaggerated MWD-LWD data into pseudo-vertical log curves that may be matched to corresponding type logs. In some embodiments, a processing unit may extrapolate KBTVD data and give on-screen comparisons of one or more type logs alongside the extrapolated KBTVD data. A user or interpreter may input various D solutions and may select one that resolves the data such that the KBTVD data closely matches a corresponding vertical type log.

Figure 6A:
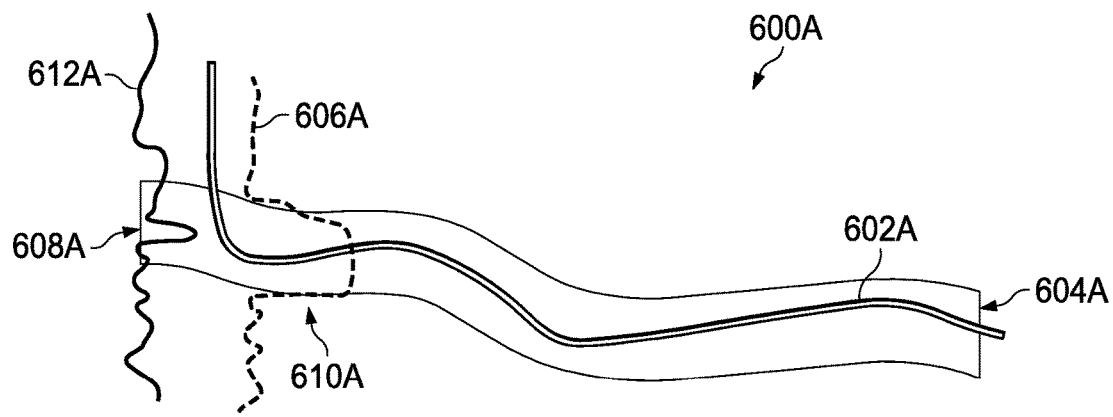
FIG. 6A illustrates an example wellpath through a stratigraphic interval.

However, if the thickness represented by a vertical type log is actually untrue, certain repeatable and observable patterns may emerge in the geosteering interpretation. For example, FIG. 6A depicts diagram 600A of wellpath 602A through a stratigraphic interval 604A. Diagram 600A depicts extrapolated type log 612A and actual log 606A. As shown in FIG. 6A, if the type log thickness 608A is thinner than the actual thickness 610A, a formation dip may appear to turn sub-parallel to a wellpath 602A.

Figure 6B:
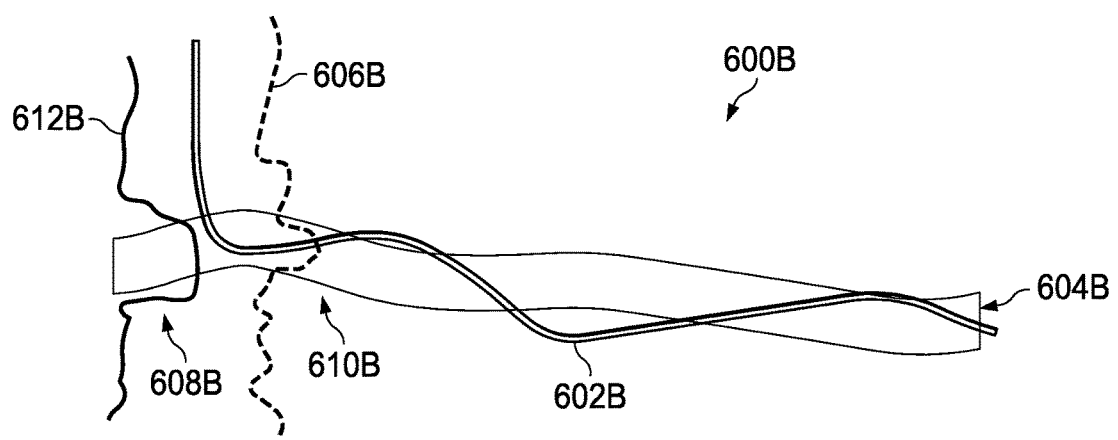
FIG. 6B illustrates an example wellpath through a stratigraphic interval.

As another example, FIG. 6B depicts another diagram 600B of wellpath 602B through a stratigraphic interval 604B. Diagram 600B depicts extrapolated type log 612B and actual log 606B. In contrast to FIG. 6A, if a type log thickness 608B is greater than an actual value 610B, a formation dip may appear to turn opposite to the wellpath 602B. By recognizing either of these patterns, an interpreter may qualitatively know that an interval thickness in the type log is incorrectly too thick or too thin for the vicinity of the horizontal well being drilled. Embodiments of the present disclosure advantageously provide further quantitative information regarding the inaccurate thickness and advantageously provide methods of correcting said inaccurate thickness.

In some embodiments of the present disclosure, a thickness error may be quantified for the local area of a horizontal well and may then be precisely corrected by flattening any two limbs of an apparent formation dip sinusoid to a median formation dip value (D'). Then, as D is no longer a variable, a Corrected True Thickness ("CTT") may be solved for. More reliable CTT algorithms may be formulated by finding median D' value across more than just two limbs of the sinusoid. In some embodiments, use of two limbs may advantageously promote a desired degree of accuracy or precision.

An example expression of a CTT may be:

$$CTT = (\sin D')R$$

In the example expression, CTT may be a Corrected True Thickness. D' may be a median formation dip angle determined by finding median dip of two sequential limbs of an apparent dip sinusoid. R may be a Measured Depth Interval Thickness as obtained from MWD or LWD log curve data in a horizontal well.

In some embodiments, a CTT value may be calculated or otherwise extrapolated by a data processing unit. A CTT value may then be applied to a digital type log file. A digital type log file may be any appropriate file format such as LAS or ASC formats. An applied CTT value may effectively edit specific depth values in an ASC-type file. For images or visual renderings of type logs, a processing unit may compress or stretch a vertical axis of the log image across a zone or section in question.

A data processing unit may further provide a visualization of a determined CTT and a compressed or stretched log image. Additional confirmation of an extrapolated CTT may be performed by repeating the aforementioned data processing or data analysis across at least several hundred feet of horizontal data. This double-check, however, may be unnecessary if the first V-STRAT result is based upon sufficient data, such as a few hundred feet of the horizontal well.

Determination of CTT may provide various advantages and be useful for various applications. For example, determination of CTT may provide for more accurate thickness data which in turn may promote more precise maneuvering of a wellbore through a horizontal well. Horizontal wells may generate an enormous spatial density of subsurface data. Such data may be in the form of log curves. Readings for log curves may be taken about every 0.5' to 1.0'. This may result in profoundly dense data sets that may otherwise be unobtainable. These close-spaced data points may also be fixed in three-dimensional space by the directional surveys and may therefore be spatially more precise than any broad-scale interpolation or extrapolation between vertical wells. By virtue of their spatially dense data, horizontal wells may reveal formation structural (dip changes and faulting) and stratigraphic details (variable bed thickness) that may not be revealed by other methods of analysis. Thus, operating companies may need the ability to mathematically and precisely interpret and integrate this new dense data set into maps, geologic reservoir evaluations, reservoir volume calculations, producible reserve calculations, and future well plans. Accordingly, the present disclosure may advantageously remove at least part of the guess work out of the overall subsurface data set by providing thickness-corrected vertical log data.

As another example, for the purposes of KBTVD-based geosteering techniques, a corrected-thickness type log may become available for the well being drilled, as well as future nearby wells. Consequently, phantom formation dip values that were actually artifacts of incorrect type log bed thicknesses may be eliminated or at least substantially diminished. One of ordinary skill in the art would appreciate that a primary goal of most geosteering interpretations may be to give drilling crews a reiteratively corrected and improved drilling target angle. This would allow drilling crews to better keep the horizontal wellpath in a productive target zone. Traditional methods may generally have relied on qualitative guesses to reconcile phantom formation dips and to estimate the correct angle. Present embodiments may quantitative address such issues and eliminate or substantially diminish phantom formation dips.

Yet another example benefit arises in that Virtual LWD or pseudo-horizontal data may be more accurately extrapolated if thickness errors have been resolved from CTT calculations. Such benefit may flow through to better designs of frac treatments and completions in general, post-completion reservoir and economic analyses, and future well planning One of ordinary skill in the art having the benefit of the present disclosure would appreciate further advantages from the aforementioned determinations of CTT.

As previously described, the methods and systems of providing for thickness correction may advantageously be performed prior to extrapolation of vertical data into pseudo-horizontal data. Accordingly, in some systems, a first data processing step may comprise extrapolating pseudo-vertical data and resolving incident angles. A second data processing step may comprise resolving thickness inaccuracies and determining a CTT. A third data processing step may comprise using an established horizontal-foot-to-vertical-foot equivalence to extrapolate pseudo-horizontal data or Virtual LWD data.

In some embodiments, analysis and processing of data through the aforementioned steps may be iterative. For example, new data may be added as drilling of a horizontal well progresses. New data collected may advantageously provide for a better stratigraphic understanding in both the horizontal and vertical directions. As another example, bed thicknesses may change in real geological environments. Accordingly, iterative analysis and correction of any interval thickness errors may advantageously provide for better geosteering.

Iterative aspects of the present disclosure may also be seen in FIG. 3, FIG. 4, and FIG. 7. For example, as seen in FIG. 7, a KBTVD analysis may generate apparent (calculated) formation dips. The generated apparent formation dip may be assessed as whether geologically valid or not. Such assessment may be performed by, for example, a user or a processor. If repetitive sinusoidal dip changes are observed, it may be concluded that an apparent formation dip is invalid or inaccurate. If an apparent calculated formation dip is geologically implausible in a local area, it may be concluded that an apparent formation dip is invalid or inaccurate. If an apparent formation dip is determined as being invalid or inaccurate, thickness correction processes may be run. Once a CTT is determined, an edited type log file may be sent to a vertical log data table.

In some embodiments, the present disclosure provides for systems operable for calculating CTT. FIG. 7 depicts an example system according to the present disclosure. It should be appreciated that the example system depicted in FIG. 7 may comprise any and all of the features previously described in FIG. 3 and FIG. 4.

The system may comprise various memory units and processing units as depicted in FIG. 7. A memory unit may be a non-transitory computer-readable storage medium. Such storage medium may be a random access memory (RAM), a read only memory (ROM), a memory card, a magnetic and/or optical recording medium and its corresponding drive, or any other appropriate storage device. A processing unit may be any of a processor, a microprocessor, a processing logic that may interpret and execute instructions, or other appropriate device. Additional memory units and processing units may be used without departing from the scope of the present disclosure.

The system of FIG. 7 may comprise a processing unit for determining Corrected True Thickness. Said processing unit may receive a determination of whether a formation dip is or is not realistic or accurate. In some embodiments, a processing unit may only receive a determination that a formation dip is not accurate. Said processing unit may find a median of a formation dip, calculate correct log thickness, and output an LAS-format edited type log. One of ordinary skill in the art would appreciate that other types or formats of output files may be appropriate and may not depart form the scope of the present disclosure.

An output type log or a corrected type log file may be transmitted to another processor for KBTVD analysis. In some embodiments, an analysis for CTT and KBTVD may occur on the same processor. In some embodiments, a corrected type log may be transmitted to an external vertical data store, and then be transmitted again to a vertical log data program memory.

More specifically, as shown in FIG. 7, a system 700 of the present disclosure may comprise a well site 702. Well site 702 may collect data or otherwise provide data from user inputs or memory storage devices. For example, in some embodiments, well site 702 may provide for rendering of wellpath plots via directional surveys 704. As another example, data collected at well site 702 may be stored in a program memory. For example, system 700 may provide for horizontal log curves program memory 706. Horizontal log curves program memory 706 may be in communication with well site 702. In this manner, horizontal log curves program memory 706 may receive from and/or transmit data to well site 702.

In some embodiments, system 700 may assign LWD data to a wellpath 708. Such assignment and related calculations and/or computation may be performed by a processing unit such as a processor, a microprocessor, a processing logic that may interpret and execute instructions, or other appropriate device. In some embodiments, after LWD data has been assigned to a wellpath, KBTVD Analysis 710 may be performed.

KBTVD Analysis 710 may utilize data input from a variety of sources. For example, a processor performing KBTVD Analysis 710 may receive data from vertical log data program memory 712, data from an interpreter 714 or practitioner, and/or repeated KBTVD analysis with corrected type log 716.

KBTVD Analysis 710 may advantageously provide valuable qualitative and/or quantitative assessment of a frac project. KBTVD Analysis 710 may help assess whether a formation dip is realistic or accurate 718, whether there is formation faulting 720, and the stratigraphic position 722 of particular layers. Based on any of these qualitative and/or quantitative assessments, interpreter 714 may adjust the parameters of the system 700. For example, the interpreter 714 may input new assumptions for processing or the interpreter 714 may reposition or change the course of the wellbore at the well site 702.

As a specific example, KBTVD Analysis 710 may help assess whether a formation dip is realistic or accurate 718. Methods of performing such assess can be seen in FIG. 6A and FIG. 6B and the accompanying description. If the formation dip is not realistic 724, particular processes may be implemented to help correct the formation dip value. In the example shown in FIG. 7, such processes is referred to as a "V-Strat" Type Log Editor Tool 728. The "V-Strat" Type Log Editor Tool may find a median of the formation dip, may calculate a corrected log thickness, and may output LAS-format edited type log. An outputted corrected type log LAS file 730 may be transmitted to and/or stored on a non-transient memory device such as external vertical data stores 732. Further, corrected type log LAS file 730 may be provided, either directly or through external vertical data stores 732 and/or vertical log data program memory to a process performing the KBTVD analysis 710.

As discussed, KBTVD Analysis 710 may help assess whether a formation dip is realistic or accurate 718. If the formation dip is realistic 726, drilling target instructions may be improved by locally correct type logs. 728. Further, if the formation dip is realistic 726, system 700 may thus provide data for horizontal to vertical depth equivalence 730. In some embodiments, resolution for said horizontal to vertical depth equivalence 730 may be at about less than or equal to one foot.

Horizontal to vertical depth equivalence 730 as provided by system 700 may be further processed for VLWD 732. VLWD 732 may virtualize vertical data into pseudo-horizontal data or computed horizontal logs. VLWD 732 may be further transmitted to a Completion Planner Module 734. Completion Planner Module 734 may be operable to facilitate the designing of frac jobs. Completion Planner Module 734 may have any of the capabilities and features described for Completion Planner Module 424 as depicted in FIG. 4. For example, Completion Planner Module 734 may also provide for depth-specific application of vertical data 736.

Depth-specific application of vertical data 736 may advantageously provide for improved visualization of subsurface stratigraphy and may allow for improved qualitative and quantitative analysis.

Further, VLWD 732 may provide for graphical VLWD plots 738. Graphical VLWD plots 738 may be presented on any appropriate digital display device. Graphical VLWD plots 738 may be presented or provided to interpreter 714 for further qualitative and/or quantitative analysis.

As will be understood by those skilled in the art who have the benefit of the instant disclosure, other equivalent or alternative devices, methods, and systems for geosteering may be envisioned without departing from the scope of the description contained herein. Accordingly, the manner of carrying out the disclosure as shown and described is to be construed as illustrative only.

Persons skilled in the art may make various changes in the shape, size, number, and/or arrangement of parts without departing from the scope of the present disclosure. For example, the position and number of memory units or processing units may be varied. In some embodiments, memory units or processing units may be interchangeable. In addition, the size of a device and/or system may be scaled up or down to suit the needs and/or desires of a practitioner. For example, a user interface device or a screen/display for presenting screen presentations of various geosteering data may vary in size as desired by a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/−about 10%, depicted value +/−about 50%, depicted value +/−about 100%) and/or a range endpoint. With respect to the former, a value of 50 depicted in an example, table, and/or drawing may form the basis of a range of, for example, about 45 to about 55, about 25 to about 100, and/or about 0 to about 100.

All or a portion of a device and/or system for geosteering may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

The invention claimed is:

1. A method for geosteering, the method comprising:
drilling a subsurface well with a wellbore associated with a wellbore drilling assembly, wherein the wellbore drilling assembly is in communication with a non-transitory computer readable storage medium and a processor, and wherein the processor is in communication with the non-transitory computer readable storage medium;
collecting, by at least one down-hole sensor associated with the wellbore, empirical measure-while-drilling data while drilling the subsurface well, wherein the empirical measure-while-drilling data comprises at least one log curve;
transmitting, the collected empirical measure-while-drilling data from the at least one down-hole sensor to the non-transitory computer readable storage medium;
storing, by a non-transitory computer readable storage medium, the collected empirical measure-while-drilling data;
determining, by the processor, a calculated vertical-log, wherein the calculated vertical-log is calculated at least in part based on the empirical measure-while-drilling data, and wherein the calculated vertical-log is reflective of stratigraphy along a substantially vertical direction;
determining, by the processor, an apparent penetrated thickness of a stratigraphic layer penetrated by the wellbore based at least in part on the empirical measure-while-drilling data;
determining, by the processor, an actual vertical thickness of the stratigraphic layer penetrated by the wellbore based at least in part on the empirical measure-while-drilling data collected when the wellbore is traveling in a substantially horizontal direction and a calculated vertical-log derived from the empirical measure-while-drilling data collected when the wellbore is traveling in the substantially horizontal direction;
operating, by the processor, the wellbore at a wellbore inclination, wherein the wellbore inclination is determined at least in part on a user input corresponding to a drilling angle;
establishing, by the processor, horizontal-log-to-vertical-log equivalence data for the stratigraphic layer based at least in part on the apparent penetrated thickness, the actual vertical thickness, and the wellbore inclination, wherein the established horizontal-log-to-vertical-log equivalence data maps vertical data along the substantially horizontal direction and provides for an equivalence between a point along a vertical direction and a point along a horizontal direction, wherein the point along the vertical direction is in a vertical type log, and wherein the point along the horizontal direction is in a log curve collected when the wellbore is traveling in the substantially horizontal direction;
determining, by the processor, a projected horizontal-log, wherein the projected horizontal-log is based at least in part on the horizontal-log-to-vertical-log equivalence data and wherein the projected horizontal-log is reflective of formation properties along the horizontal direction;
displaying, on a display device in communication with the processor, a visual rendering of the projected horizontal-log, thereby depicting the projected horizontal-log as though it had been collected in a horizontal well without first drilling the horizontal well; and using the visual rendering of the projected horizontal-log, delivering or transmitting the visual rendering to a drilling operation to provide access to a different visualization of the correlation between vertical type log and horizontal log curves, wherein such delivery or transmission is used to guide the wellbore to drill a horizontal well in a more accurate and efficient manner, thereby increasing the likelihood that the wellbore is drilled or maintained within a desired stratigraphic interval, and optimize post-drill hydraulic frac jobs to increase effectiveness and reduce costs.

2. The method for geosteering of claim 1, the method further comprising:
displaying, by the display device, a graph of the empirical measure-while-drilling data.

3. The method for geosteering of claim 1, wherein the horizontal-log-to-vertical-log equivalence data is established without requiring data from any more than one vertical pilot well.

4. The method for geosteering of claim 2, wherein the graph of the empirical measure-while-drilling data is presented adjacent to the graph of the projected horizontal-log.

5. The method for geosteering of claim 1, the method further comprising:
adjusting a drilling path of the wellbore based at least in part on a formation dip angle determined by the processor.

6. The method for geosteering of claim 1, the method further comprising:
adjusting a drilling path of the wellbore based at least in part on the projected horizontal-log determined by the processor.

7. The method for geosteering of claim 1, the method further comprising:
receiving a user input corresponding to an adjusted thickness value for a stratigraphic layer along the substantially vertical direction.

8. The method for geosteering of claim 7, the method further comprising:
determining, by the processor, an adjusted horizontal-log, wherein the adjusted horizontal-log is calculated at least in part based on the adjusted thickness value.

9. The method for geosteering of claim 1, wherein the horizontal-log-to-vertical-log equivalence data has a resolution of less than one foot.

10. The method for geosteering of claim 1, wherein the vertical type log is based on empirical measure-while-drilling data.

11. The method for geosteering of claim 1, wherein the vertical type log is a processed type log determined by the processor.

12. The method for geosteering of claim 1, the method further comprising:
displaying, on a display device, the calculated vertical log alongside an actual vertical log.

13. The method for geosteering of claim 1, the method further comprising:
determining, by the processor, a plurality of projected horizontal logs, wherein each of the plurality of projected horizontal logs is based at least in part on the horizontal-log-to-vertical-log equivalence data.

14. A system for geosteering, the system comprising:
a wellbore configured to drill a subsurface well, wherein the wellbore is associated with a wellbore drilling assembly;

at least one down-hole sensor associated with the wellbore, wherein the at least one down-hole sensor is configured to collect empirical measure-while-drilling data while drilling the subsurface well, wherein the empirical measure-while-drilling data comprises at least one log curve;

a non-transitory computer readable storage medium, wherein the non-transitory computer readable storage medium is in communication with the at least one down-hole sensor, and wherein the non-transitory computer readable storage medium is configured to store the collected empirical measure-while-drilling data;

a processor in communication with the non-transitory computer readable storage medium and the wellbore, the processor configured to:
determine an apparent penetration thickness of a stratigraphic layer penetrated by the wellbore based at least in part on the empirical measure-while-drilling data;
determine an actual vertical thickness of the stratigraphic layer penetrated by the wellbore based at least in part on the empirical measure-while-drilling data collected when the wellbore is traveling in a substantially horizontal direction and a calculated vertical-log derived from the empirical measure-while-drilling data collected when the wellbore is traveling in the substantially horizontal direction;
operate the wellbore at a wellbore inclination, wherein the wellbore inclination is determined at least in part on a user input corresponding to drilling angle;
establish horizontal-log-to-vertical-log equivalence data for the stratigraphic layer based at least in part on the apparent penetrated thickness, the actual vertical thickness, and the wellbore inclination, wherein the established horizontal-log-to-vertical-log equivalence data maps vertical data along the substantially horizontal direction and provides for an equivalence between a point along a vertical direction and a point along a horizontal direction, wherein the point along the vertical direction is in a vertical type log, and wherein the point along the horizontal direction is in a log curve collected when the wellbore is traveling in the substantially horizontal direction;
determine a projected horizontal-log, wherein the projected horizontal-log is based at least in part on the horizontal-log-to-vertical-log equivalence data and, wherein the projected horizontal-log is reflective of formation properties along the horizontal direction; and a display device in communication with the processor, wherein the display device is configured to display a visual rendering of the projected horizontal-log that is delivered or transmitted to a drilling operation, thereby depicting the projected horizontal-log as though it had been collected in a horizontal well without first drilling the horizontal well, and wherein such delivery or transmission is used to drill a horizontal well and guide the wellbore in a more accurate and efficient manner, thereby increasing the likelihood that the wellbore is drilled or maintained within a desired stratigraphic interval, and optimize post-drill hydraulic frac jobs to increase effectiveness and reduce costs.

15. The system for geosteering of claim 14, wherein the display device is further configured to display a graph of the empirical measure-while-drilling data.

16. The system for geosteering of claim 14, wherein the horizontal-log-to-vertical-log equivalence data is established without requiring data from any more than one vertical pilot well.

17. The system for geosteering of claim 15, wherein the graph of the empirical measure-while-drilling data is presented adjacent to the graph of the projected horizontal-log.

18. The system for geosteering of claim 14, wherein the drilling path of the wellbore is adjusted based at least in part on a formation dip angle determined by the processor.

19. The system for geosteering of claim 14, wherein the drilling path of the wellbore is adjusted based at least in part on the projected horizontal-log determined by the processor.

20. The system for geosteering of claim 14, the system further comprising:
an input receiving device configured to receive a user input corresponding to an adjusted thickness value for a stratigraphic layer along with the substantially vertical direction.

21. The system for geosteering of claim 20, wherein the processor determines an adjusted horizontal-log, and wherein the adjusted horizontal-log is calculated at least in part based on the adjusted thickness value.

22. The system for geosteering of claim 14, wherein the horizontal-log-to-vertical-log equivalence data has a resolution of less than one foot.

23. The system for geosteering of claim 14, wherein the vertical type log is based on empirical measure-while-drilling data.

24. The system for geosteering of claim 14, wherein the vertical type log is a processed type log determined by the processor.

25. The system for geosteering of claim 14, wherein the display device is configured to display the calculated vertical log alongside an actual vertical log.

26. The system for geosteering of claim 14, wherein the processor is further configured to determine a plurality of projected horizontal logs, wherein each of the plurality of projected horizontal logs is based at least in part on the horizontal-log-to-vertical-log equivalence data.

* * * * *